(12) United States Patent
Park et al.

(10) Patent No.: US 10,311,479 B2
(45) Date of Patent: Jun. 4, 2019

(54) SYSTEM FOR PRODUCING PROMOTIONAL MEDIA CONTENT AND METHOD THEREOF

(71) Applicant: Korea Electronics Technology Institute, Seongnam-si, Gyeonggi-do (KR)

(72) Inventors: Jong Bin Park, Hwaseong-si (KR); Tae beom Lim, Yongin-si (KR); Kyung Won Kim, Seoul (KR); Jong Jin Jung, Seoul (KR); Jae won Moon, Seoul (KR); Seung Woo Kum, Yongin-si (KR)

(73) Assignee: KOREAN ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 615 days.

(21) Appl. No.: 15/006,043

(22) Filed: Jan. 25, 2016

(65) Prior Publication Data

US 2017/0109786 A1 Apr. 20, 2017

(30) Foreign Application Priority Data

Oct. 20, 2015 (KR) ........................ 10-2015-0146120

(51) Int. Cl.
*G06F 16/28* (2019.01)
*G06F 16/78* (2019.01)
(Continued)

(52) U.S. Cl.
CPC ....... *G06Q 30/0256* (2013.01); *G06F 16/285* (2019.01); *G06F 16/78* (2019.01);
(Continued)

(58) Field of Classification Search
None
See application file for complete search history.

(56) References Cited

U.S. PATENT DOCUMENTS 6,195,646 B1 * 2/2001 Grosh .................. G06Q 20/102
705/26.41
9,619,583 B2 * 4/2017 Lau .................... G06F 16/90335
(Continued)

FOREIGN PATENT DOCUMENTS

KR 100869924 B1 11/2008
KR 100967699 B1 7/2010
(Continued)

*Primary Examiner* — Matthew T Sittner
(74) *Attorney, Agent, or Firm* — Hauptman Ham, LLP

(57) ABSTRACT

A system for producing promotional media content includes a strategic meta information analysis processing unit configured to process various types of pieces of strategic meta information in various formats to an unstructured data batch having a certain weight value, a media content analysis processing unit configured to classify and analyze each meta information by similarity by using meta information of various types of media content or meta information actively extracted by analyzing each media content, an association analyzing unit configured to calculate association between strategic meta information processed through the strategic meta information analysis processing unit and the media content processed through the media content analysis processing unit, and a media content synthesizing unit configured to finally synthesize promotional media content by using the various types of strategic meta information, the media content, and the association information calculated by the association analyzing unit.

20 Claims, 13 Drawing Sheets

(51) Int. Cl.
*G06F 16/901* (2019.01)
*G06F 16/903* (2019.01)
*G06F 16/9535* (2019.01)
*G06Q 30/00* (2012.01)
*G06Q 30/02* (2012.01)

(52) U.S. Cl.
CPC ...... *G06F 16/901* (2019.01); *G06F 16/90335* (2019.01); *G06F 16/9535* (2019.01)

(56) References Cited

U.S. PATENT DOCUMENTS

| | | | | |
|---|---|---|---|---|
| 2003/0130861 | A1* | 7/2003 | Seitz | G06Q 10/06 705/400 |
| 2003/0195832 | A1* | 10/2003 | Cao | G06Q 30/08 705/37 |
| 2003/0220773 | A1* | 11/2003 | Haas | G06Q 10/0637 703/2 |
| 2004/0181370 | A1* | 9/2004 | Froehlich | G06F 9/5083 702/187 |
| 2004/0181457 | A1* | 9/2004 | Biebesheimer | G06Q 30/02 705/14.49 |
| 2005/0071182 | A1* | 3/2005 | Aikens | G06Q 10/00 705/500 |
| 2005/0189415 | A1* | 9/2005 | Fano | G06N 20/00 235/383 |
| 2005/0256946 | A1* | 11/2005 | Childress | G06Q 10/06 709/223 |
| 2006/0089866 | A1* | 4/2006 | Cheng | G06Q 10/10 709/204 |
| 2006/0111973 | A1* | 5/2006 | Brown | G06Q 30/02 705/14.27 |
| 2006/0167984 | A1* | 7/2006 | Fellenstein | G06F 9/5072 709/203 |
| 2007/0143171 | A1* | 6/2007 | Boyd | G06Q 30/0278 705/306 |
| 2008/0167928 | A1* | 7/2008 | Cao | G06Q 10/06 705/80 |
| 2009/0030829 | A1* | 1/2009 | Chatter | G06Q 30/0206 705/37 |
| 2010/0250296 | A1* | 9/2010 | Channabasavaiah | G06Q 10/04 705/7.25 |
| 2010/0262509 | A1* | 10/2010 | Delia | G06Q 10/02 705/26.1 |
| 2011/0004509 | A1* | 1/2011 | Wu | G06Q 10/06375 705/7.37 |
| 2011/0238477 | A1* | 9/2011 | Urbanski | G06Q 30/0224 705/14.25 |
| 2012/0029974 | A1* | 2/2012 | Councill | G06Q 30/0206 705/7.35 |
| 2012/0030199 | A1* | 2/2012 | Mohajer | G06Q 30/0256 707/723 |
| 2012/0221430 | A1* | 8/2012 | Naghmouchi | G06Q 30/0283 705/26.7 |
| 2012/0290348 | A1* | 11/2012 | Hackett | G06Q 10/06 705/7.13 |
| 2012/0290500 | A1* | 11/2012 | Ettl | G06Q 30/0283 705/36 R |
| 2012/0303400 | A1* | 11/2012 | Boss | G06Q 30/06 705/7.12 |
| 2012/0303491 | A1* | 11/2012 | Hill | G06Q 30/06 705/27.2 |
| 2013/0054296 | A1* | 2/2013 | Gajakosh | G06Q 10/06 705/7.22 |
| 2013/0246213 | A1* | 9/2013 | Lee | G06Q 30/0283 705/26.4 |
| 2013/0275085 | A1* | 10/2013 | Cheng | G06Q 10/0639 702/182 |
| 2013/0297412 | A1* | 11/2013 | Batra | G06F 16/00 705/14.49 |
| 2014/0052492 | A1* | 2/2014 | Boss | G06Q 10/06315 705/7.25 |
| 2014/0096140 | A1* | 4/2014 | Aquino | G06Q 10/1095 718/103 |
| 2014/0289188 | A1* | 9/2014 | Shimanovsky | G06F 16/21 707/609 |
| 2014/0310065 | A1* | 10/2014 | Chowdhary | G06Q 30/0283 705/7.35 |
| 2015/0100384 | A1* | 4/2015 | Ettl | G06Q 30/0206 705/7.35 |
| 2016/0140789 | A1* | 5/2016 | Wickersham, III | G07C 13/00 705/12 |
| 2016/0148227 | A1* | 5/2016 | Choe | G06Q 30/0202 705/7.31 |
| 2016/0203506 | A1* | 7/2016 | Butler, IV | G06Q 30/0222 705/14.23 |
| 2017/0004408 | A1* | 1/2017 | Edelen | G06N 5/02 |
| 2017/0060992 | A1* | 3/2017 | Bhide | G06F 16/24578 |
| 2017/0109786 | A1* | 4/2017 | Park | G06F 16/285 |
| 2017/0372341 | A1* | 12/2017 | Fukuda | G06Q 30/0206 |
| 2017/0372349 | A1* | 12/2017 | Fukuda | G06Q 30/0244 |
| 2017/0372378 | A1* | 12/2017 | Firth | G06Q 10/04 |

FOREIGN PATENT DOCUMENTS

| | | |
|---|---|---|
| KR | 101252933 B1 | 4/2013 |
| KR | 101302852 B1 | 9/2013 |
| KR | 101342122 B1 | 1/2014 |
| KR | 101352713 B1 | 1/2014 |

* cited by examiner

TF-IDF

LSA, K=1

LSA, K=5

LSA, K=10

SLA, K=15

LSA, K=20

LSA, K=25

LSA, K=30

LSA, K=35

SYSTEM FOR PRODUCING PROMOTIONAL MEDIA CONTENT AND METHOD THEREOF

CROSS-REFERENCE TO RELATED APPLICATIONS

This application claims priority under 35 U.S.C. § 119 to Korean Patent Application No. 10-2015-0146120, filed on Oct. 20, 2015, the disclosure of which is incorporated herein by reference in its entirety.

TECHNICAL FIELD

The present invention relates to a system for producing promotional media content and a method thereof, and more particularly, to a system for producing promotional media content by automatically classifying media content such as a story container or a resource item and recommending appropriate template when a search or query request is received in an unstructured, semi-structured, or structured format, and a method thereof.

BACKGROUND

In general, promotion (or publicizing) may refer to an activity of an individual, enterprises, organizations, or organic bodies to widely advertise or sell ideas, activities, or goods through communication activities.

There are various types and methods of promotion from a method of holding a conversation in a face-to-face manner to a method of increasing a ripple effect using various mass media such as newspapers and broadcasting.

Publicity activities may be one of communication schemes between people. Also, publicity activities may be maximized in effect when senses of seeing, talking, smelling, hearing, and feeling are effectively utilized. In the current environment, a scheme of using sense of sight and sense of hearing such as TVs or Internet video services is effective and general.

A representative promotional scheme is using a means such as mass media such as newspapers, radio, and TV, in which a minority of specialists produces promotional materials and transmits the produced promotional materials to a plurality of consumers through various mass media.

Recently, however, as the Internet technology has advanced and rapidly spread and various media authoring tools have emerged, new content transmitting schemes have spread.

For example, video may be streamed in real time through an Internet environment, and rapid prevalence of mobile devices has promoted an infrastructure enabling an access to promotional materials anytime and anywhere, providing an environment in which general users may directly produce and distribute promotional materials.

However, in spite of evolution of domestic and foreign environments, it is yet difficult to produce and distribute high quality promotional materials fitting promotional purposes.

Various powerful editing tools and services allowing multimedia content to be easily produced have been introduced, but in order to utilize tools skillfully, a process of learning tools for a long period of time and high cost is incurred to have relevant tools.

A scheme of outsourcing promotional content to a specialized studio to produce promotional content may be considered, which, however, is also high in price. That is, it is still too burdensome for individuals or small businessmen to directly produce promotional media content in terms of shortage of expertise or additional cost.

The related art system for producing promotional media content as mentioned above classify, store, and manage created template or resources such as pictures according to a predefined rule.

Templates or resources are proposed as an interface generally in the form of a gallery to users, and users selects desired templates or resources from among them to complete a promotional image.

In general, in order to realize it, a scheme of classifying or searching for templates or resources by attaching a tag describing the templates or resources thereto, and here, when meta information is in an unstructured format, a separate structuring process is required for management and analysis. This operation is burdensome as a service scale is increased and the number of times of processing per hour is increased.

SUMMARY

Accordingly, the present invention provides a system for producing promotional media content by automatically classifying story container (extended concept of template) or a resource on the basis of a semantic word using unstructured, semi-structured, or structured meta information describing the storage container or the resource together, and a method thereof.

The present invention also provides a system for producing promotional media content by recommending an appropriate story container or resource items when pieces of strategic meta information such as promotional strategy or user intention are input, and a method thereof.

In one general aspect, a system for producing promotional media content includes: a strategic meta information analysis processing unit configured to process various types of pieces of strategic meta information in various formats to an unstructured data batch having a certain weight value; a media content analysis processing unit configured to classify and analyze each meta information by similarity by using meta information of various types of media content or meta information actively extracted by analyzing each media content; an association analyzing unit configured to calculate association between strategic meta information processed through the strategic meta information analysis processing unit and the media content processed through the media content analysis processing unit; and a media content synthesizing unit configured to finally synthesize promotional media content by using the various types of strategic meta information, the media content, and the association information calculated by the association analyzing unit.

The various types of pieces of strategic meta information in various formats may include at least one of marketing strategy information, publicity strategy information, user information, user intention information, statistical service information, and feedback information.

The media content may be classified in system into a common resource item representing media resources such as a picture, video, music, and text information commonly used in a service system or a program; a personal resource item representing media content that each user has directly uploaded or purchased; and a story container representing an outcome designed by using a gain filter, a change effect, and an overlay effect in order to specifically express an abstract concept called story.

The media content information may include at least one of a picture, video, music, text, and font.

The common resource item, the personal resource item, and the story container may include different meta information.

The media content analysis processing unit may include: a semantic word extracting unit configured to extract a semantic word regarding N number of pieces of meta information regarding various types of media content; a semantic word dictionary unit configured to create a new dictionary by comparing semantic words extracted by the semantic word extracting unit and words in a predefined dictionary; and a semantic word-based association analyzing unit configured to calculate similarity between pieces of meta information on the basis of semantic words by using the dictionary generated by the dictionary unit, and classify the pieces of meta information by using the similarity value.

The semantic word extracting unit may extract a semantic word by using a first method of extracting a semantic word by analyzing similarity between a text string input by using a dynamic program and words in the predefined dictionary, a second method of separating the input text string to a word set by using a regular expression, removing a meaningless word from the separated word set, and extracting a semantic word, or a combination of the first method and the second method.

When the semantic word extracted by the semantic word extracting unit is not included in the predefined dictionary, the semantic word dictionary unit may provide a new index to the semantic word and newly add the semantic word to the dictionary, configure meta information with words present in the created dictionary, convert the meta information into a set of dictionary indices, and store the converted set in a memory or a file, and thereafter, whenever new media content is added, the semantic word dictionary unit may update the semantic word to create a new dictionary by repeating the process.

The semantic word-based association analyzing unit may use at least one of topic modeling techniques including at least one of a term frequency-inverse document frequency (RF-IDF) technique, a latent semantic analysis/indexing (LSA) method, and a latent dirichlet allocation (LDA) technique.

The media content synthesizing unit may include: a project conversion unit configured to convert a project file as a set of meta information regarding pieces of media content to fit media synthesizing; and a rendering unit configured to synthesize various types of media content by using the pieces of meta information converted through the project conversion unit.

The association analyzing unit may create a query statement by using each strategic meta information such as marketing, publicity strategy, and publicity intention, express the created query statement as an index by using the dictionary created by the dictionary unit, express the query statement expressed as the dictionary index in a vector space based on topic modeling, calculate similarity between pieces of meta information describing the media content expressed in the topic-modeled vector space and the input query statement, sort the pieces of meta information according to the calculated similarity value, and output media content having high similarity to the media content synthesizing unit.

In another general aspect, a method for producing promotional media content includes: processing various types of pieces of strategic meta information in various formats to an unstructured data batch having a certain weight value; classifying and analyzing each meta information by similarity by using meta information of various types of media content or meta information actively extracted by analyzing each media content; calculating association between the processed strategic meta information and the processed media content; and finally synthesizing promotional media content by using the various types of strategic meta information, the media content, and the calculated association information.

The various types of pieces of strategic meta information in various formats may include at least one of marketing strategy information, publicity strategy information, user information, user intention information, statistical service information, and feedback information.

The media content may be classified in system into a common resource item representing media resources such as a picture, video, music, and text information commonly used in a service system or a program; a personal resource item representing media content that each user has directly uploaded or purchased; and a story container representing an outcome designed by using a gain filter, a change effect, and an overlay effect in order to specifically express an abstract concept called story.

The media content information may include at least one of a picture, video, music, text, and font, and the common resource item, the personal resource item, and the story container may include different meta information.

The classifying and analyzing of each meta information may include: extracting a semantic word regarding N number of pieces of meta information regarding various types of media content; creating a new dictionary by comparing the extracted semantic words and words in a predefined dictionary; and calculating similarity between pieces of meta information on the basis of semantic words by using the dictionary generated by the dictionary unit, and classifying the pieces of meta information by using the similarity value.

The extracting of a semantic word may include extracting a semantic word by using a first method of extracting a semantic word by analyzing similarity between a text string input by using a dynamic program and words in the predefined dictionary, by using a second method of separating the input text string to a word set by using a regular expression, removing a meaningless word from the separated word set, and extracting a semantic word, or by combining the first method and the second method.

The creating of a dictionary may include: when the extracted semantic word is not included in the predefined dictionary, providing a new index to the semantic word and newly adding the semantic word to the dictionary; configuring meta information with words present in the created dictionary, converting the meta information into a set of dictionary indices, and storing the converted set in a memory or a file; and repeating the process to perform updating whenever new media content is added.

The classifying of the pieces of meta information may include: classifying the pieces of meta information by using at least one of topic modeling techniques including at least one of a term frequency-inverse document frequency (TF-IDF) technique, a latent semantic analysis/indexing (LSA) method, and a latent dirichlet allocation (LDA) technique.

The synthesizing of media content may include: converting a project file as a set of meta information regarding pieces of media content to fit media synthesizing; and rendering various types of media content by using the converted pieces of meta information.

The calculating of association may include: creating a query statement by using each strategic meta information such as marketing, publicity strategy, and publicity intention; expressing the created query statement as an index by using the dictionary created by the dictionary unit; expressing the query statement expressed as the dictionary index in a vector space based on topic modeling; calculating similarity between pieces of meta information describing the media content expressed in the topic-modeled vector space and the input query statement; and sorting the pieces of meta information according to the calculated similarity value and subsequently outputting media content having high similarity.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the specification, like numbers refer to like elements.

In describing embodiments of the present invention, a detailed description of known techniques associated with the present invention unnecessarily obscure the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, a system for producing promotional media content and a method thereof according to an embodiment of the present invention will be described in detail.

Figure 1:
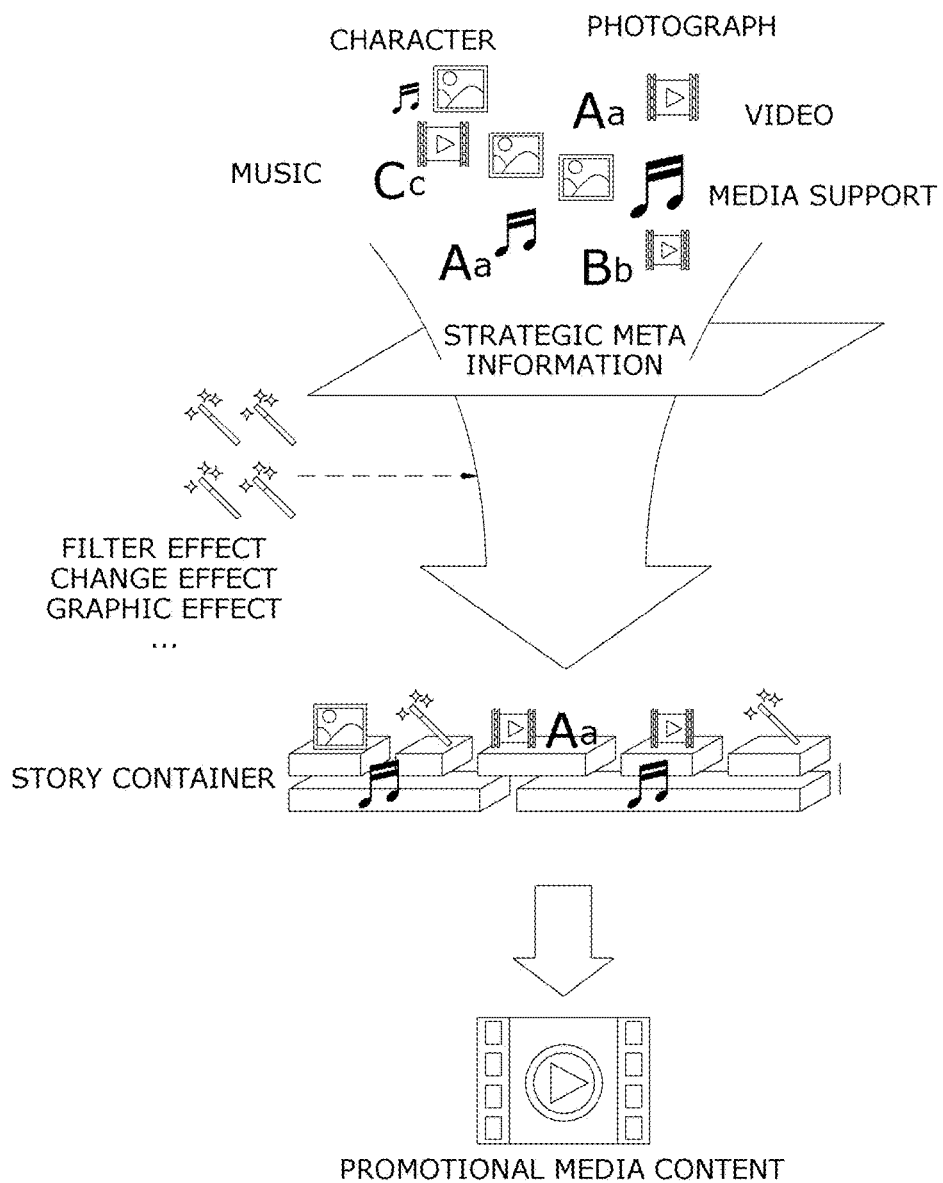
FIG. 1 is a conceptual view illustrating producing of promotional media content according to an embodiment of the present invention.

FIG. 1 is a conceptual view illustrating a method of producing promotional media content according to an embodiment of the present invention.

As illustrated in FIG. 1, a user may provide various media content resources such as music, a sound, a character, a picture, video, and the like, to a system to produce promotional media content.

Main features and differences of the present invention lie in the fact that marketing strategies, publicity strategies, user intention, various types of feedback information, and the like, may be effectively and extensively utilized to produce promotional media content.

A system for producing promotional media content according to an embodiment of the present invention will be described in detail with reference to FIGS. 2 through 5.

Figure 2:
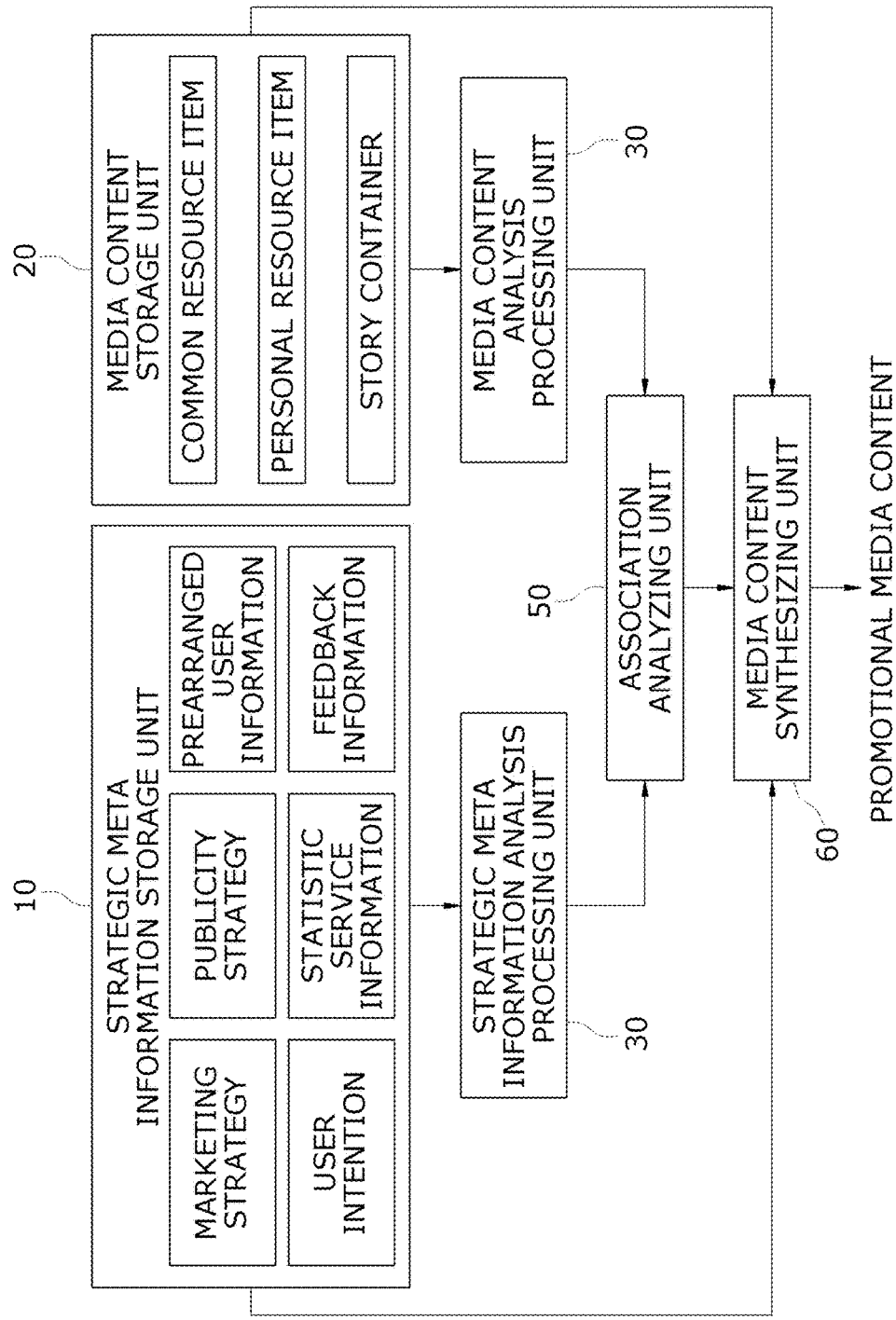
FIG. 2 is a block diagram illustrating a system for producing promotional media content according to an embodiment of the present invention.
Figure 3:
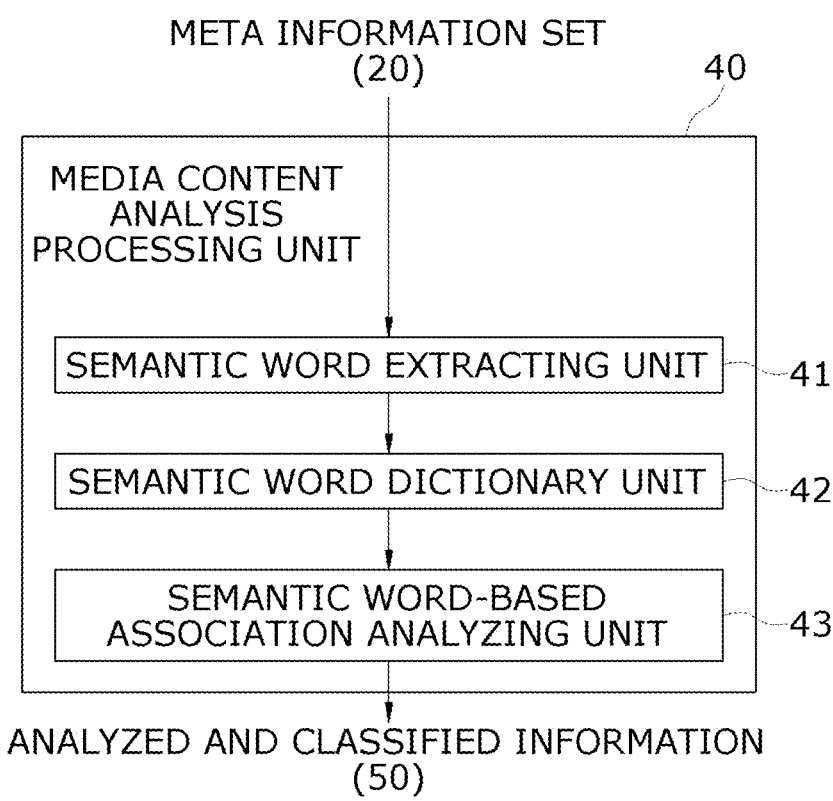
FIG. 3 is a detailed block diagram illustrating a media content analysis processing unit illustrated in FIG. 2.
Figure 4A:
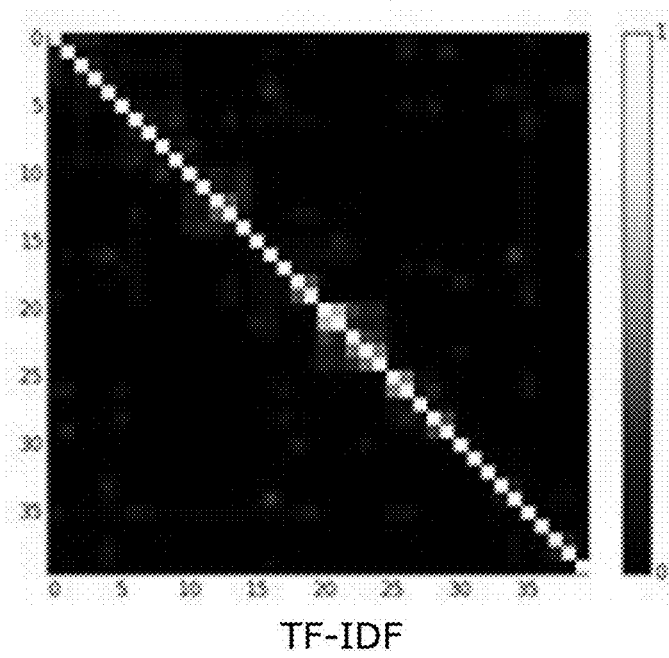
FIG. 4A to FIG. 4I is a view illustrating a relationship of mutual similarity between pieces of meta information by an association analyzing unit illustrated in FIG. 2.
Figure 4B:
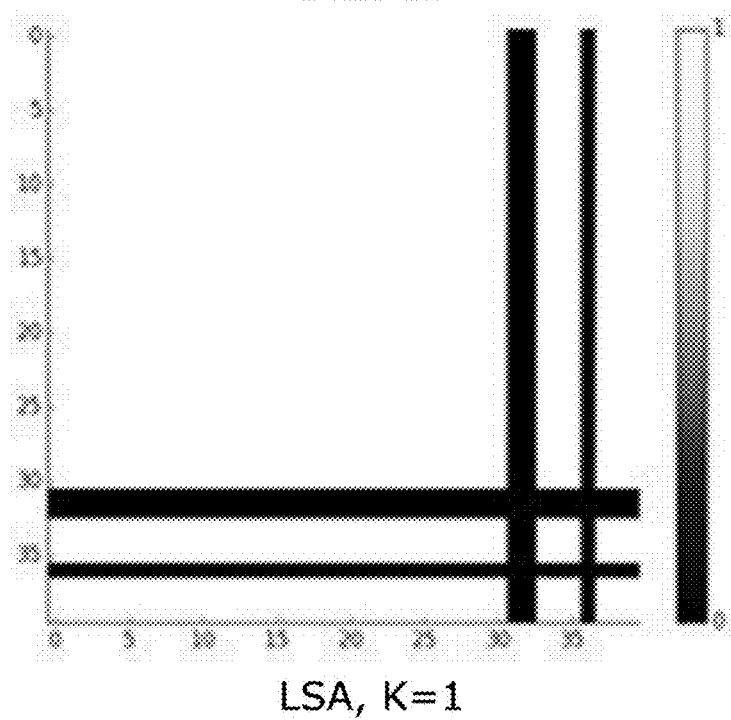
Figure 4C:
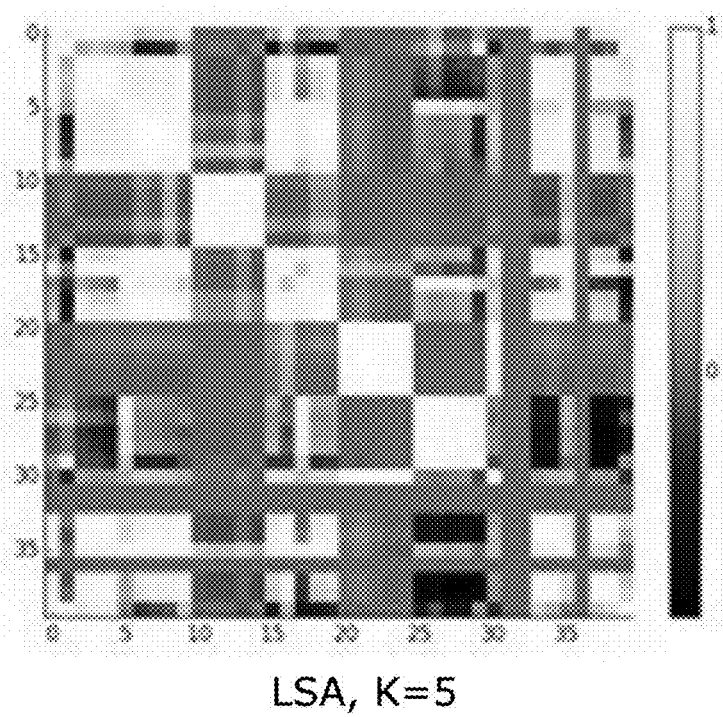
Figure 4D:
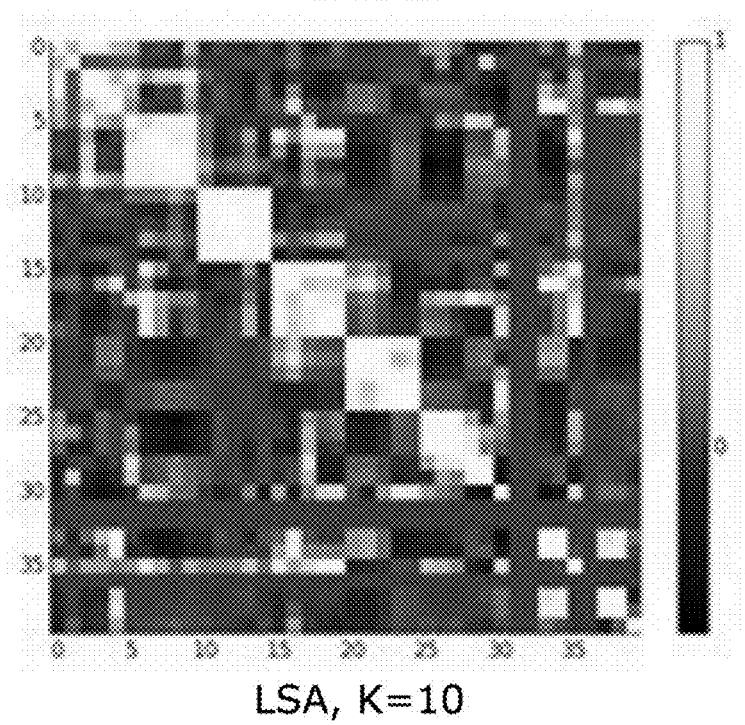
Figure 4E:
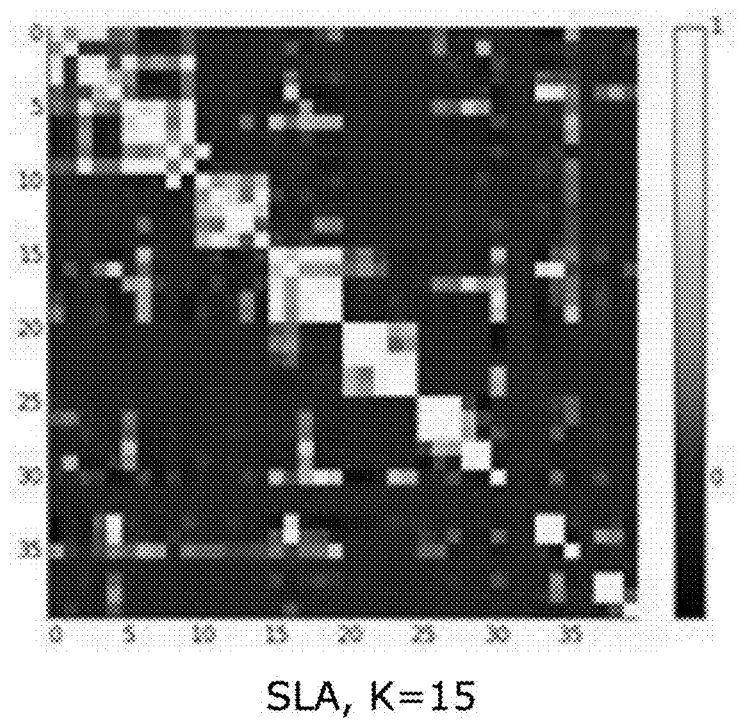
Figure 4F:
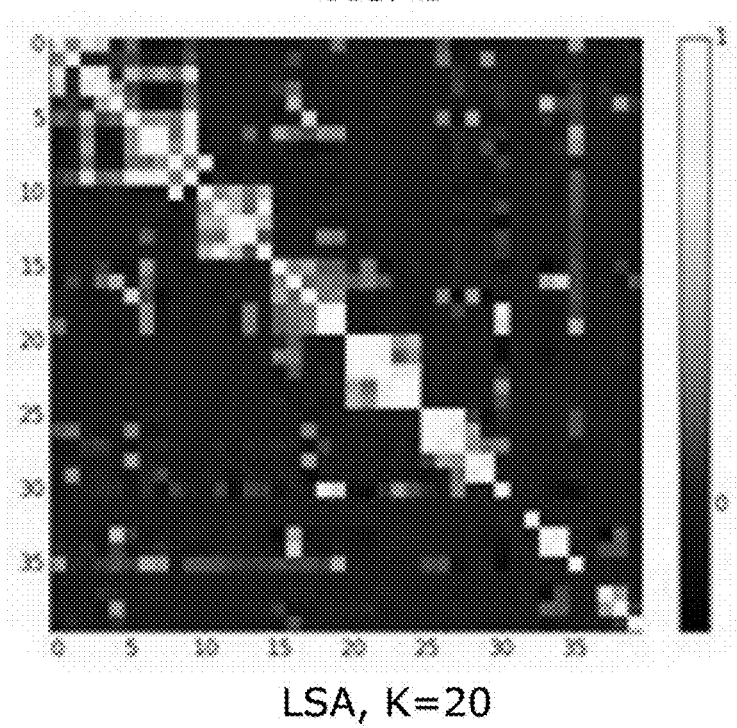
Figure 4G:
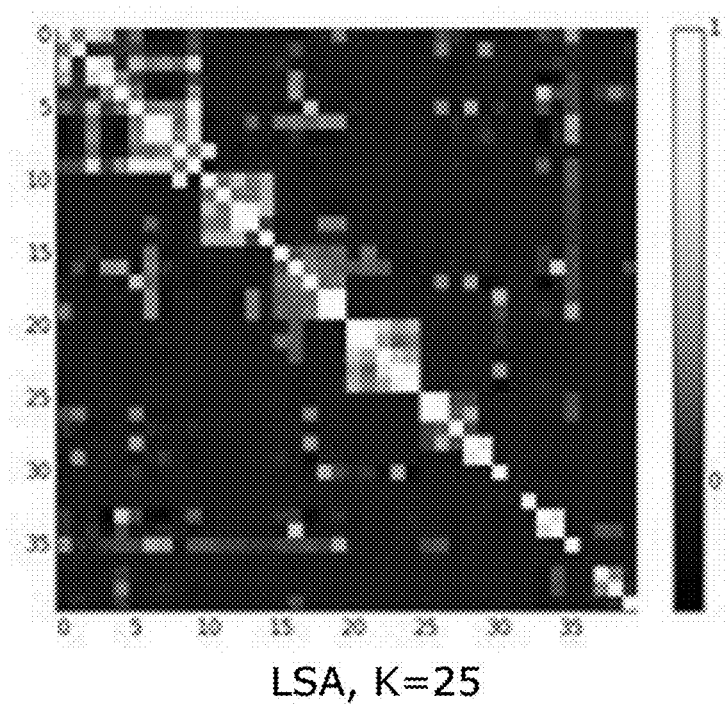
Figure 4H:
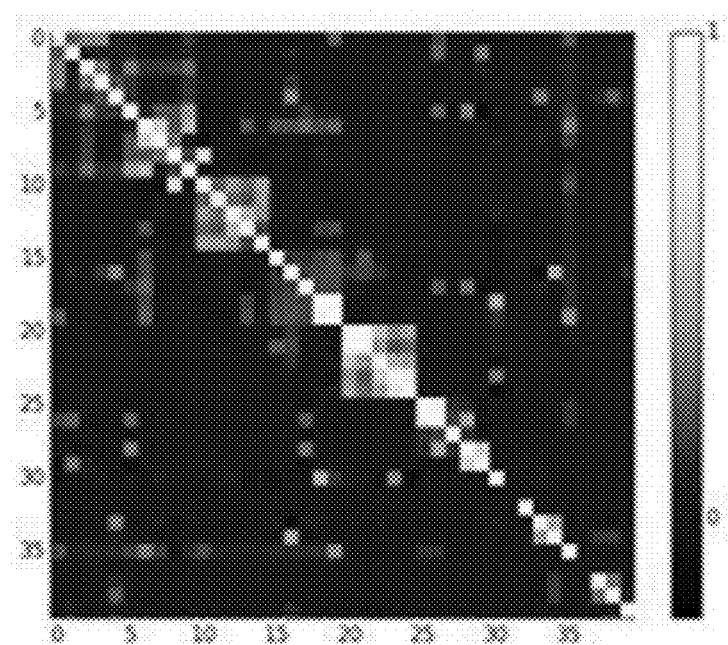
Figure 4I:
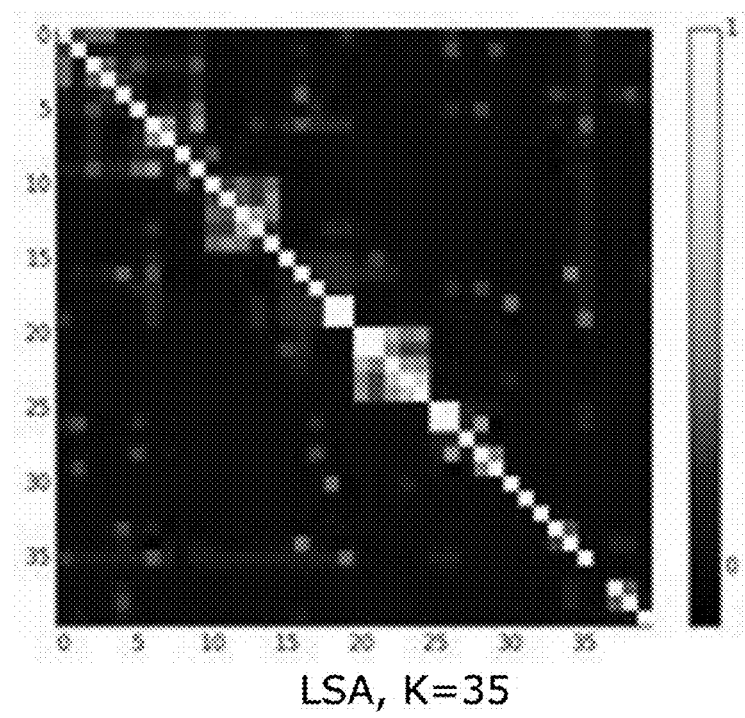
Figure 5:
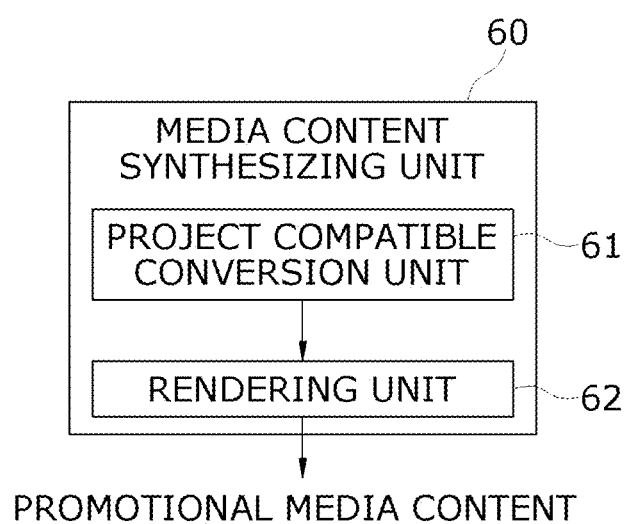
FIG. 5 is a detailed block diagram illustrating a media content synthesizing unit illustrated in FIG. 2.

FIG. 2 is a block diagram illustrating a system for producing promotional media content according to an embodiment of the present invention, FIG. 3 is a detailed block diagram illustrating a media content analysis processing unit illustrated in FIG. 2, FIG. 4 is a view illustrating a relationship of mutual similarity between pieces of meta information by an association analyzing unit illustrated in FIG. 2, and FIG. 5 is a detailed block diagram illustrating a media content analysis processing unit illustrated in FIG. 2.

First, before describing the system for producing promotional media content according to an embodiment of the present invention, major purposes of the present invention and problems to be solved to achieve the major purposes will be described.

Core input elements in the system for producing promotional media content are strategic meta information and media content.

A general system for producing promotional media content uses a scheme in which an editing specialist or a general user produces media content using a predetermined editing tool upon receiving media content.

To this end, design ability, ability to establish promotional and marketing strategies, ability to utilize editing tools, relevant hardware device or software, and the like, are required, which make the scheme hard, complicated, and difficult for anyone to perform.

In order to solve these problems, the present invention synthesizes promotional media content corresponding to strategic meta information with available media content. As stated above, a major purpose of the present invention is to allow general users to obtain a desired outcome and accomplish an intended objective by using a service system or an application program to which the present invention is applied even though the users lack abilities or do not have equipment related to producing promotional materials.

However, in order to accomplish such an objective, three big problems should be solved.

First, a process of classifying and organizing media content in consideration of similarity thereof is required. That is, as the process of classifying and organizing media content, a method of manually classifying and organizing media content one by one by business operators that provide services or developers that implement functions has been generally used, but a manual operation is not practical in a case in which the number of pieces of content is increased or in case of a resource item that individuals input in real time.

Second, a method for processing and utilizing strategic meta information which is not uniform and changed over time. That is, regarding the method of processing strategic meta information which is not uniform but changed over time, a scheme of converting generally input pieces of information into a standard format properly defined structurally in advance and processing the converted format may be used, but this method may be appropriate in a system having a closed structure and is difficult to apply in a system situation orienting an open/extended structure in which data regarding strategic meta information is changed over time and is not easy to define in advance.

Third, promotional media content needs to be produced in an automated manner as much as possible, and here, strategic meta information should be reflected, while features of media content are taken into consideration. That is, in that strategic meta information should be reflected, while features of media content are to be taken into consideration, in order to produce promotional media content in an automated manner as much as possible, a generally applied method achieves such an objective by enabling a user to select a predefined template and directly insert a picture, video, music, and text (examples of resource items in the present invention) into the selected template. Here, the template is partially similar to a concept of a storage container, and the story container is defined as a concept including a template in the present invention.

With this scheme, a user should check various templates one by one and select an appropriate template from among them, and also, in order to insert a picture, video, music, and text thereinto, the user should check each resource.

In order to solve these problems, as illustrated in FIG. 2, the system for producing promotional media content according to an embodiment of the present invention may include a strategic meta information storage unit 10, a media content storage unit 20, a strategic meta information analysis processing unit 30, a media content analysis processing unit 40, an association analyzing unit 50, and a media content synthesizing unit 60.

First, the strategic meta information storage unit 10 may include marketing strategy information, promotional strategy information, prearranged user information, user intention information, statistical service information, feedback information, and the like.

The marketing strategy information may be meta information regarding a marketing method, and the promotional strategy information may be meta information indicating a specific publicity method.

The prearranged user information may be prearranged information related to a user such as a location or a business type of a business operated by the user, and the user intention information may be meta information directly input by the user.

The statistical service information refers to statistical service information provided by a content management server (CMS) that manages produced promotional media content, and the feedback information refers to information collected from those who get at promotional media content.

The strategic meta information is not limited to the information enumerated above and may be newly added, and an internal format thereof may also be frequently changed.

A concept of such strategic meta information may be clarified through specific examples illustrated in Table 1 below.

TABLE 1

| Strategic meta information | Feature | (e.g.) unstructured format | (e.g.) structured format |
|---|---|---|---|
| Marketing strategy | Process user input information, card usage information of each area, and SNS and Web trend information | "Current monthly sales: 8 million won, target monthly sales: 10 million won, business district in which store is located shows a high usage proportion of women in 50s, please make video advertisement in signage outside of store in order to attract female customers" | {"Current monthly sales: 8 million won, target monthly sales: 10 million won, latent client age: "50s", latent client sex: "female", promotion media: "external signage of store", promotional material type: "video"} |
| Promotion strategy | Process marketing strategy and trend information primarily | "Please produce video advertisement stressing quiet and warm atmosphere for communication" | {Atmosphere: "Quiet, warmth", promotional material: "video"} |
| User information | Obtain business type information and location information | "Café, Bundang-gu, Sungnam, Kyunggi-do" | {Business type: "Cafe", area: "Sungnam, Kyunggi-do"} |
| User intention | Recognize intention through user interface | "We want to sell Americano cheaply to induce customers and obtain profit margins with fresh juice. Please make promotional material for this" | {Induction goods: "americano", Revenue goods: "Fresh juice"} |
| Statistic service information | Analysis service log file and relevant statistics information | "Humor content 30%, Health content 12%, . . . " | {Preferred theme type: "humor, health"} |
| Feedback information | Analysis user feedback information | "Comment: fabulous. I definitely want to go there", I like image click number: 135, I don't like image click number: 14 | {Feedback type: positive, I don't like image click number: 14} |

In Table 1, an example of "marketing strategy information" will be described in detail. A marketing strategy generating system that may be associated with the system for producing promotional media content of the present invention may produce marketing strategy information using user input information, information regarding card usage in each area, an SNS, and Web trend information.

The produced marketing strategy information is provided to the system for producing promotional media content, and here, the marketing strategy information may have a structured format (or well-formed format), a semi-structured format, or a non-structured format. For example, the non-structured format may be appropriate for providing a specific method related to marketing in a natural language scheme to allow the general public to easily understand, such as <current monthly sales: 8 million won, target monthly sales: 10 million won, commercial supremacy in which a store is located has a high card usage rate of women in 50s, please make video advertisement on external signage of the store to attract female customers in 50s>.

For computer-based data management and analysis processing, it is desirable to have a structured format as illustrated in the example in a JSON format below. In the example of JSON, an arrangement of keys and values is illustrated, but a structure thereof may be diverse.

In order to configure a structured format, a text file or a comma separated values (CSV) file having a field element on XML or a database or a structured format, instead of JSON, may also be used.

```
{
    Current monthly sales: "8 million won",
    Target monthly sales: "10 million won",
    Latent customer age: "50s",
    Latent customer gender: "female",
    Publicity medium: "External signage of store",
    Publicity material form: "video"
}
```

However, in actuality, even though specific strategic meta information has a structured format, if other strategic meta information has unstructured format, combining and processing them is problematic.

For example, in case of strategic meta information regarding "user intention information", a specific user may freely describe his or her intention or idea for publicity such as <"We want to sell Americano cheaply to induce customers and obtain profit margins with fresh juice. Please make promotional material for this">, and such a description is mostly unstructured, and since each user has different ideas and intentions, a process itself of changing the description into a structured format is not easy.

Even though every unstructured information is converted into structured information, fields or contents thereof may be added or changed over time, and in such a case, an algorithm processing such information needs also to be changed, involving other difficulties.

The strategic meta information analysis processing unit 30 illustrated in FIG. 2 processes pieces of various types of strategic meta information in various formats stored in the strategic meta information storage unit 10 as an unstructured data batch having a weight, and enables various types of meta information in unstructured, semi-structured, and structured formats to be easily combined and used. That is, it is assumed that the strategic meta information has been pre-processed, and this is for analysis in units of words, paragraphs, and sentences that may include a meaning.

Such strategic meta information may expressed with N number of pieces of partial strategic meta information as illustrated in Equation (1) below.

Each of the pieces of partial strategic meta information may have a weight value as expressed in Equation (2) below, and the sum of all the weight values is 1. That is, partial strategic meta information is defined, and a weight value is given to each of the strategic meta information. Here, the weight values may be directly given by a user, or may be determined according to a certain method. However, the method of giving a weight value is not necessarily limited to a specific method.

$$\{q_1, q_2, \ldots, q_N\} \quad (1)$$

$$\{w_1, w_2, \ldots w_N\}, w_1 + w_2 + \ldots + w_N = 1 \quad (2)$$

where q is strategic meta information, and w is a weight value.

The pieces of partial strategic meta information defined thusly may be configured as strategic meta information in an integrated form using various methods described hereinafter. That is, N number of pieces of partial strategic meta information may be collected to single integrated strategic meta information q as expressed in Equation (3) below. Here, the addition symbol "+" in Equation (3) refers to adding text to create greater text $$q = q_1 + q_2 + \ldots + q_N \quad (3)$$

In another embodiment, as illustrated in a table below, only when the weight value $w_i$ of an ith partial strategic meta information is greater than a predetermined threshold value T, $q_i$s may be added to obtain a final q. That is, q may be obtained as follows.

```
q = null
for( I = 0 ; I < N : I++) {
    if w_i ≤ T
        q = q + q_i
    }
}
```

Equation (4) shows a relational expression for generating single strategic meta information q using pieces of strategic meta information expressed as text information and weight values thereof, as a generalized form of the aforementioned embodiments.

$$q = f(q_1, q_2, \ldots, q_N; w_1, w_2, \ldots w_N) \quad (4)$$

The media content storage unit 20 illustrated in FIG. 2 stores media content, and here, the media content may be classified into three systems of a common resource item, a personal resource item, and a story container.

In the present invention, media content refers to a picture, video, music, text, font, and the like. Here, a container file used to create different content by compiling a picture or video is also regarded as media content.

In this sense, the common resource item may be defined as media resources such as a picture, video, music, text information that may be commonly used in a service system or a program and may be expressed as Equation (5) below.

$$R = \{R_1, R_2, \ldots R_N\} \quad (5)$$

where N is a finite integer of 0 or greater.

The common resource item may be prepared by a relevant service business operator or a program developer in advance. Thus, the common resource item may be manually operated by a person or automatically analyzed and classified using an arithmatic processing unit before a service or a program is released or distributed.

Even though the common resource item is added at the time when a service starts, since there is authority to process the common resource item and control right, the added common resource item may be processed through additional analysis and classification.

Such common resource items have meta data expressed as Equation (6) below. For example, ith common resource item $R_{i \in \{1, 2, \ldots N\}}$ has ith meta data $D_i^R{}_{\in \{1, 2, \ldots N\}}$ corresponding thereto.

$$D^R = \{D_1^R, D_2^R, \ldots D_N^R\} \quad (6)$$

The personal resource item of the media content storage unit 20 refers to media sources such as picture, video, music, text information, and the like, similar to the common resource item, but here, the personal resource item refers to media content that each of users has directly uploaded or purchased. The personal resource item may be expressed as Equation (7) below.

$$R' = \{R'_1, R'_2, \ldots R'_N\} \quad (7)$$

The personal resource item is featured that it is dynamically added or corrected while a related service or program is operated. This provides a user interface (UI) to allow a user to directly classify the personal resource item, which, however, is cumbersome on the user side.

Preferably, a service operator or developer is prohibited from directly accessing the information in consideration of personal information security. Thus, preferably, a real user directly analyzes and classifies the personal resource item, or the personal resource item is automatically analyzed or classified using an arithmatic processing unit. For analysis and classification, personal resource items have meta data expressed as Equation (8) below, like the common resource item.

$$D^{R'} = \{D_1^{R'}, D_2^{R'}, \ldots D_N^{R'}\} \quad (8)$$

Resource items may be materials for creating promotional media content and need to be united or combined to complete an outcome.

To this end, in the present invention, a story container is used. The story container may be an outcome designed using an individual or a filter, a change effect, an overlay effect, and the like, to specifically express an abstract concept called story, and may be expressed as Equation (9) below.

$$S = \{S_1, S_2, \ldots, S_N\} \quad (9)$$

In general, the story container is similar to a concept termed a template, but the story container is mainly different from a template in that it is a generalized concept that internal resources can be substituted, combined, and updated, rather than being fixed. The story container has meta information expressed as Equation (9) below. Here, each story container has meta information in the form of a text string expressed as Equation (10) below.

$$D^S = \{D_1^S, D_2^S, \ldots D_N^S\} \quad (10)$$

Such story containers are generally configured as common resource items of Equation (5) and various filters, a change effect, and the like, are combined. The story containers configure several project files expressed as Equation (11) below using pictures, video, or music files provided by users expressed as Equation (7).

$$P = \{P_1, P_2, \ldots P_N\} \quad (11)$$

In the present invention, each of project files is defined as an aggregation of resource and pieces of information including information sufficient for rendering promotional media content. For example, a certain project file includes both pictures, videos, and the like, required in producing structured information or image such as JSON or XML. That is, the project file is configured as the story container, the common resource item, and the personal resource item of Equation (5), (6), (7), (8), (9), and (10), and metal files associated therewith are re-processed.

The media content analysis processing unit 40 illustrated in FIG. 2 performs an analysis processing function such as analyzing meta information of each of the aforementioned media content, or the media content to actively extract meta information, and classifying the media content according to similarity using the extracted meta information.

The media content analysis processing unit 40 will be described in detail with reference to FIG. 3.

FIG. 3 is a detailed block diagram illustrating the media content analysis processing unit 40 illustrated in FIG. 2. Here, the common resource item, the personal resource item, and the story container included in the media content have meta information corresponding thereto as described above.

As illustrated in FIG. 3, the media content analysis processing unit 40 performs an operation of analyzing and classifying media content using meta information, and an input of the media content analysis processing unit 40 is an aggregation of meta information as expressed by Equation (12) below. For example, ith meta information $D_{i \in \{1, 2, \ldots N\}}$ is expressed as a text string and has a word as a minimum unit. This value is considered to correspond to Equations (6), (8), and (10). Thereafter, the aggregation of the meta information is processed to facilitate analysis, and classified on the basis of similarity.

$$D = \{D_1, D_2, \ldots D_N\} \quad (12)$$

As illustrated in FIG. 3, the media content analysis processing unit 40 may include a semantic word extracting unit 41, a semantic word dictionary unit 42, and a semantic word-based association analyzing unit 43.

The semantic word extracting unit 41 serves to extract semantic words with respect to N number of pieces of meta information. Here, a semantic word may be defined as a word that may contribute to describing a topic or a feature of a document. The semantic word may also be defined as excluding some morphemes that does not have a significant meaning or meaningless words in a text document, although a necessary and sufficient condition is not met. This is part that may be defined and implemented according to necessity and situations, and should not limit the scope of the present invention.

A specific embodiment of extracting a semantic word in this point of view will be described.

A different algorithm or advance preparations may be required according to languages or text encoding schemes, but two following methods may be used or may be combined or deformed to be used according to a definition of the semantic word.

First, when a text pattern present in an input text string is present in a dictionary, compared with a prepared semantic word set (dictionary), the text pattern is extracted as a semantic word.

Second, an input text string is separated into words using a punctuation character such as a blank, a comma, a semicolon, and the like, and words considered as being meaningless are excluded, thus extracting the text string.

In processing meta information in the form of a text string according to the first method, for example, a dictionary is prepared. Similarity between words of the input text string and the dictionary is analyzed using an algorithm such as a dynamic programming scheme to extract a semantic word.

Basically, a scheme of extracting a word only when the word is identical 100% through character string matching is used. However, a scheme of extracting a word with similarity having a threshold value or greater, not 100%, may be used as an extended scheme.

Also, when morpheme information or similar word information is present in the dictionary, the information may be added to the extracted semantic word. This method is advantageous in that a morphine of each word can be analyzed and importance of a word may be determined on the basis of previously inspected information, but has possibility in that a process rate is relatively low and words omitted in the dictionary are disregarded.

In an example of extracting a semantic word from meta information according to the second method, first, an input text string is separated into word sets using a regular expression, or the like, and a meaningless word is removed from the separated word sets. For example, in case of English, preferably, routinely used words such as {"A", "The", "For", "To", . . . } may be excluded in extracting word sets. This method is advantageous in that high speed processing is performed, in spite of shortcomings that morphemes of words are difficult to classify.

The aforementioned methods may be applied to meta information configured in languages other than English, like Hangul, and in a case in which languages are mixed, meta information may be processed by preparing several dictionaries, and in the second method, a word set to be removed may be prepared according to languages. Meanwhile, the first method and the second method may be combined to be used.

The semantic word dictionary unit 42 illustrated in FIG. 2 performs a function of creating a semantic word extracted by the semantic word extracting unit 41 as a dictionary and updating the created dictionary.

The operation of creating and updating a semantic word as a dictionary by the semantic word dictionary unit 42 will be described.

First, when a semantic word is extracted from meta information regarding specific media content by the semantic word extracting unit 410, determined whether the extracted word is included in an existing dictionary.

When the extracted word is not included in the existing dictionary, the extracted word is given a new index and newly added to a dictionary.

The meta information includes words present in the created dictionary, and the meta information may be converted into a set of dictionary indices and stored in a memory or a file.

Each time new media content is added, the aforementioned process is repeatedly performed.

In general, the dictionary preferably uses a dictionary data structure. The reason is as follows.

In order for the arithmatic processing unit to effectively process semantic words extracted by the semantic word extracting unit 41, an appropriate data structure is required. In general, a scheme termed a dictionary data structure is widely used.

The dictionary data structure generally includes a key and a value and supports various data types, and the dictionary data structure itself is appropriate for addition, deletion, updating, and searching, and other application or program using the dictionary data structure may reduce capacity of a repository that may be generated during processing and enhance a process rate.

In detail, for example, in Equation (12), N number of pieces of input meta information $D=\{D_1, D_2, \ldots D_N\}$ in the form of a text string creates a single semantic word dictionary for a meta information set D. If (N+1)th meta information $D_{N+1}$ is created, semantic words are extracted from $D_{N+1}$ and added to a previously created semantic word dictionary.

In order to clarify this process, a direct embodiment may be expressed as shown in Table 2 below.

TABLE 2

[0] Travel, me, illustration, picture, travel picture, goods, sunrise, mountain, sea
[1] Travel, diary, memory, picture, video, sweetly, postscript, event, propose, picture, video, restaurant
[2] Travel, outdoor, mountain, extreme, sports, sea, lodge, condo, pension
[3] Travel, USA, Europe, Southeast Asia, schedule, weather, sea, mountain, location
[4] Travel, relax, break, mild, weather, love, happiness, mood, piece
[5] Lodge, overnight, individual, image, package, crisp, travel
[6] Lodge, destination, cafe, property, high rank, signage, postcard
[7] Lodge, premium, portfolio, property, loan, bank
[8] Lodge, hotel, private rental, price, inexpensive, convenient, traffic
[9] Lodge, travel, warm, destination, inexpensive, home stay, Airbnb
[10] Restaurant, flour-based food, taste, health, traffic, inexpensive, school, flavoring matter
[11] Restaurant, Japanese food, taste, fresh, material, tuna, odoro, sushi, udong
[12] Restaurant, Korean food, traditional, traditional Korean food, taste, rough, neat, radish water kimchi, dried radish greens, material, flavoring matter
[13] Restaurant, Korean food, menu, bibimbap, radish water kimchi, cooked rice, nicely, dignity, high rank, taste
[14] Restaurant, webfoot octopus, squid, small octopus, taste, fresh, material, spicy, sour, sweet, flavoring matter
[15] Romantic, lyrical, cafe, flower shop, book store, advertisement image, video
[16] Cafe, weather, calm, mild, scent, simple, daily life, memory
[17] Cafe, lifeliness, feeling of happiness, vividness, image, lyrical, template
[18] Cafe, mildness, music, background, interior decoration, menu
[19] Cafe, coffee, dessert, interior decoration, goods, menu
[20] Design, composition, simple, cubic, message, implication, ending, opening, deep blue
[21] Design, simple, advertisement image, cubic, deep blue, ending
[22] Design, gold, pop-up, brief, simple, core, topic, attention characteristic, implication, ending, opening
[23] Design, wood design, attention, wood, product, performance, restaurant, service, dynamic, core, topic, attention characteristic, implication, ending, opening, moderation
[24] Design, white design, attention, white, beauty, hospital, restaurant, service, attention characteristic, implication, ending, opening
[25] SF, game, publicity, dreamlike, dynamic, future, world, liveliness
[26] SF, dreamlike, game, publicity, image, picture, production
[27] Game, trailer, large, RPG, sequence, character
[28] Game, mobile, image, logo, play, image, casual, casual, theme, version
[29] Casual, casual, video, android, horizontal, theme
[30] Pure, smoothness, cosmetics, product, advertisement
[31] Vintage, old film, film, feeling
[32] Beam, flare, motion, space sense, extravagance, electronic, fast
[33] Relax, text, sensitivity, sound, various fields
[34] Happy, daily, sensitive, font, calm, noise, sensitivity
[35] Goods, publicity, slide show, slide, cafe, restaurant, travel, property, beauty treatment, fashion
[36] Freshness, briskness, smoothie
[37] Humor, smile, happiness, satisfaction, inordinate, fun, ha-ha, ho-ho, laughter
[38] Love, happiness, satisfaction, together, altogether, smile, composure, vanilla, sky, nature
[39] Wait, memory, esquire, you, love, tired, loneliness, heart, pain, alone, thought Table 2 shows semantic words extracted by the semantic word extracting unit 41 from each of pieces of meta information included in the story container expressed by Equation (10).

In the example of Table 2, N=40. For example, in Table 2, in an 11th document indexed by [10], semantic words of "Restaurant, flour-based food, taste, health, traffic, inexpensive, school, flavoring matter" are extracted and enumerated. In Table 2, the semantic words are directly enumerated to help understanding, but, when internal arithmetic operation is performed, it is preferred to express and process by pieces of index information indicating semantic words using a dictionary data structure.

The semantic word-based association analyzing unit 43 illustrated in FIG. 3 calculates similarity between pieces of meta information using a topic modeling method on the basis of semantic words using the dictionary created by the semantic word dictionary unit 420, and classifies the pieces of meta information using the similarity value. A preferred embodiment thereof will be described.

First, a method of classifying association of semantic words and recommending semantic words using term frequency-inverse document frequency (TF-IDF) will be described.

A promotional video is synthesized using media content including various meta documents to produce promotional media content. To this end, classification, similarity calculation, and search and recommendation techniques are internally required. In terms of implementation, a scheme of attaching an array of tag information to media content and expressing and processing it as a vector space, or a TF-IDF technique of processing media content using frequency of each word of meta information expressed as text by extending the scheme are simple and effective. However, in the case of TF-IDF method, when an amount of meta information is increased, accuracy of similarity estimation is reduced, and only when a search keyword and a word in the meta document completely match, it is reflected in similarity calculation. Thus, in order to improve additional performance, the TF-IDF method may require refinement and normalization process regarding a keyword.

Using the TF-IDF method, generation frequency of semantic words may be calculated and association thereof may be analyzed.

An operation of classifying and recommending a semantic word using topic modeling will be described.

The topic modeling technique is a tool for searching for topics hidden in given documents.

Specific applications include: (1) "searching for hidden topics (themes) included in given documents", (2) "adding annotation according to searched topics", and (3) "organizing, summarizing, searching, and predicting documents using annotations. This is a sort of clustering process regarding input information, which belongs to a category of unsupervised learning in machine learning. There are various techniques for topic modeling, and among them, a latent semantic analysis/indexing (LSA) method and a latent dirichlet allocation (LDA) method are simple and have excellent performance and may be preferably applied to the present invention.

The LSA method is similar to a principle component analysis (PCA) concept in signal processing. It is a scheme of performing topic modeling by decomposing $A_{nm}$, a set of observable documents, using singular value decomposition (SVD) as illustrated in Equation (8).

In terms of text-based topic modeling, when Equation (13) is interpreted, n corresponds to the number of input documents, m corresponds to the number of words or terms, and r corresponds to the number of topics. Externally exposed data is only $A_{nm}$, but hidden data $U_{nr}$, $S_{rr}$, $V_{mr}$ may be searched by performing SVD, a topic modeling or data compression technique may be selected according to the way in which the data is used.

In terms of topic modeling, $U_{nr}$ may be interpreted as a vector for matching documents to a topic and $V_{mr}$ may be interpreted as a vector for matching words to a topic. $S_{rr}$ is a diagonal matrix including eigenvalues, which refers to strength of a topic searched according to sizes of values.

$$A_{nm} = U_{nr} S_{rr} V^T_{rm} \tag{13}$$

In the LDA method, ordinary concepts of a topic, a document, or a word are interpreted by probability model. A topic is a set of words, and when it is interpreted by a probability theory, a topic may be considered as a probability distribution function including random variables termed word. Each document is a set of words, but it may also be regarded as a weighted sum mixture probability distribution function regarding certain topics.

Thus, a topic, a word, and a document may be interpreted by a probability model, and it may be supposed that there is a hidden connection structure therebetween. In terms of probability problem, the LDA may be a process of searching for individual probability distribution functions and weight parameter values from a mixture probability distribution function. Here, disposition order of words is not considered, thus relatively simplifying models. This is called a "bag-of-words" assumption. When the problem is defined in this manner, a problem of searching for a parameter of the mixture probability distribution function arises and an expectation maximization algorithm or methods improving it are mainly used. The LDA is assumed to be a dirichlet distribution useful for Bayesian probability calculation, and the number of R number of probability distribution functions is proposed by the user.

The LSA method among several topic modeling methods for analyzing semantic word-based association by the semantic word-based association analyzing unit 43 illustrated in FIG. 3 will be described.

The LSA method is advantages in that it provides simple and stable performance, compared with the LDA method, while complementing shortcomings of the TF-IDF method. Application of the topic modeling technique to classification and recommendation of a story container is a problem of performing topic modeling using meta information ($D^S$) connected to the story container of Equation (10).

A specific method thereof will be described. First, q of Equation (4) is created using each of strategic meta information such as marketing, a publicity strategy, publicity intention, and the like. This is called a query statement.

The q is expressed as an index using the dictionary created in the previous process. Here, among words extracted from the query statement q, a word not present in the dictionary is disregarded.

Thereafter, the query statement q expressed as a dictionary index is expressed in a topic modeling-based vector space, and similarity between pieces of meta information describing media content expressed in the topic-modeled vector space and the input query statement is calculated as expressed in Equation (14).

$$\text{similarity} = \cos(\theta) = \frac{A \cdot B}{\|A\| \|B\|} = \frac{\sum_{i=1}^{n}(A_i \times B_i)}{\sqrt[2]{\sum_{i=1}^{n}(A_i)^2} \times \sqrt[2]{\sum_{i=1}^{n}(B_i)^2}} \tag{14}$$

The pieces of meta information is sorted according to calculated similarity values, and media content having high similarity is output.

That is, hidden topics are searched on the basis of appearance patterns of words included in template meta documents and classified according to the topics, and here, the number of topics is given by the number of R, and a selection method thereof is mostly heuristic.

To sum up, association may be analyzed on the basis of semantic words by using the topic modeling method such as LSA or LDA.

The association analyzing unit 50 illustrated in FIG. 2 calculates association between strategic meta information re-processed through the strategic meta information analysis processing unit 30 and the media content analyzed and processed through the media content analysis processing unit 40. Accordingly, a story container or a resource item for producing promotional media content may be classified or recommended. The recommended information may be used for full-automatically or semi-automatically processing an operation of synthesizing promotional media content.

An embodiment of recommending media content according to various types of strategic meta, information in a state in which association analysis is completed on the basis of semantic words by the association analyzing unit 50 will be described.

First, q of Equation (4) is created using each strategic meta information such as marketing, publicity strategy, publicity intention, and the like. It is called a query statement.

The query statement q is expressed as an index using a dictionary created in a previous process. Here, among the words extracted from the query statement q, a word not present in the dictionary is disregarded.

Thereafter, the query statement q expressed by the dictionary index is expressed in a topic modeling-based vector space, and similarity between pieces of meta information describing media content expressed in the topic-modeled vector space and the input query state is calculated as expressed by Equation (14).

Here, in order to calculate similarity between two vectors A and B, in general, a cosine similarity formula as in Equation (14) is used. That is, when similarity is −1, it means that the vectors A and B are completely opposite. When similarity is 0, it means that the vectors A and B are independent from each other, and when similarity is 1, it means that the vectors A and B match completely. Through the process, media content (common resource item, personal resource item, and story container) may be classified on the basis of association therebetween and may be utilized during an operation such as recommendation or searching.

Table 3 below shows a process of classifying and recommending when strategic meta information is input using meta information as illustrated in Table 2.

As described above, Table 2 shows forty unstructured meta information extracted as semantic words. In the embodiment of Table 2, seven topics of {travel, lodge, restaurant, café, design, game, other} are intentionally distinguished and configured in consideration of a business type to be publicized. It features that the classified items are grouped to be similar by fives, excluding {other}. For example, in Table 2, it can be seen that #0 to #4 relate to {travel} and #5 to #9 relate to {lodge}. The pieces of meta information relate to other classified items in a predetermined portion, but there is a case including only a word not used in other items, like #36 in {other}.

Table 3 shows an example of performing topic modeling according to the LSA method using semantic words of the meta information of Table 2 and recommending appropriate media content when strategic meta information is input.

In Table 3, words extracted from the strategic meta information are the same as the item #10 of Table 2, having similarity of nearly 1, and templates related to restaurant and lodge are recommended at a higher rank in order of 12, 14, 11, 13, 8, . . . . Here, the reason for the presence of similarity of a negative number is because the cosine similarity formula of Equation (14) is used.

This example shows that story containers corresponding to the initial intention are recommended by using the present invention, even though the strategic meta information includes structured meta information and unstructured meta information together.

TABLE 3

\* Example of strategic meta information:
Business type: "flour-based food, restaurant", publicity strategy = "Stress its vicinity to school and convenience in traffic, configure inexpensive menus", publicity intention: healthy and delicious without flavoring matter"}
\* Extracted words: (Same as #10 item in dictionary)
{restaurant, flour-based food, taste, health, traffic, inexpensive, school, flavoring matter}
\* Example of topic modeling regarding 10 topics (K = 10)
[0] −0.393*"design" + −0.393*"ending" + −0.351*"implication" + −0.351*"opening" + −0.282*"attention characteristic" + −0.204*"simple" + −0.199*"attention" + −0.199*"restaurant" + −0.199*"service" + −0.191*"subject"
[1] 0.401*"restaurant" + 0.337*"taste" + 0.335*"travel" + 0.216*"material" + 0.210*"flavoring matter" + 0.194*"photograph" + 0.173*"cafe" + 0.153*"lodge" + 0.151*"Korean food" + 0.151*"nicely"
[2] −0.396*"travel" + 0.302*"taste" + −0.286*"photograph" + 0.278*"restaurant" + −0.210*"video" + 0.200*"material" + 0.191*"flavoring matter" + −0.164*"mountain" + −0.164*"sea" + −0.156*"lodge"
[3] −0.501*"image" + −0.372*"game" + −0.222*"theme" + −0.222*"casual" + −0.222*"casual" + 0.181*"travel" + −0.170*"SF" + −0.170*"dreamlike" + −0.169*"version" + −0.169*"play"
[4] −0.379*"video" + 0.373*"cafe" + −0.368*"photograph" + 0.257*"lodge" + 0.186*"property" + −0.177*"propose" + −0.177*"diary" + −0.177*"postscript" + −0.177*"event" + −0.177*"sweetly"
[5] −0.414*"happiness" + −0.324*"love" + −0.262*"smile" + −0.262*"satisfaction" + 0.171*"lodge" + −0.150*"altogether" + −0.150*"composure" + −0.150*"vanilla" + −0.150*"nature" + −0.150*"sky"
[6] 0.485*"cafe" + 0.199*"menu" + 0.196*"memory" + −0.191*"sea" + −0.191*"mountain" + 0.172*"interior decoration" + −0.167*"travel" + −0.157*"lodge" + 0.150*"video" + 0.144*"simple"
[7] −0.239*"simple" + 0.216*"publicity" + −0.194*"memory" + 0.175*"smile" + 0.175*"satisfaction" + 0.154*"goods" + 0.146*"photograph" + −0.142*"weather" + −0.141*

TABLE 3-continued

"loneliness" + −0.141*"you"
[8] 0.406*"lodge" + −0.208*"weather" + −0.198*"simple" + −0.178*"mountain" + −0.178*"sea" + 0.174*"destination" + 0.158*"property" + −0.151*"publicity" + 0.149*"video" + −0.138*"game"
[9] −0.217*"publicity" + −0.212*"you" + −0.212*"wait" + −0.212*"heart" + −0.212*"thought" + −0.212*"pain" + −0.212*"alone" + −0.212*"esquire" + −0.212*"loneliness" + −0.212*"tired"
* Results recommended through similarity analysis among 40 templates when words extracted from strategic meta information are input (aligned in order of high similarity)
[(10, 0.99999994), (12, 0.96954387), (14, 0.95164019), (11, 0.9509294), (13, 0.9145661), (8, 0.35120615), (35, 0.19930224), (7, 0.17918736), (9, 0.16030958), (6, 0.15088126), (5, 0.14760816), (2, 0.086455025), (29, 0.074984722), (39, 0.049634695), (28, 0.047898445), (23, 0.02247897), (24, 0.019126773), (38, 0.0090787606), (31, 0.0), (32, 0.0), (36, 0.0), (37, −0.00530951), (1, −0.0074476823), (18, −0.012554379), (22, −0.01362268), (4, −0.014859326), (17, −0.016441755), (19, −0.0207964), (3, −0.021926962), (30, −0.024547208), (20, −0.030332856), (0, −0.037311688), (21, −0.048699819), (33, −0.060024895), (34, −0.074627325), (26, −0.079447947), (27, −0.080461517), (16, −0.08578527), (15, −0.086388439), (25, −0.11432723)]

FIG. 4A to FIG. 4I is a view illustrating a relationship of mutual similarity between forty pieces of meta information by the TF-IDF and the LSA topic modeling methods.

As illustrated in FIG. 4A to FIG. 4I, the TF-IDF and the LSA may be utilized for classifying media content, and advantages and disadvantages of the TF-IDF and LSA methods may be checked through the result of FIG. 4A to FIG. 4I.

Unlike the LSA method, a similarity value of the TF-IDF method has a value between 0 and 1, and when words do not match 100% as in the result of FIG. 4A, it is not reflected in similarity calculation, and thus, even though words are similar in their meaning, similarity therebetween has a value of 0 in many cases.

In the LSA method, it can be seen that some five templates are grouped and separated as initially expected. However, in the drawings, the diagonal line item is similarity with itself, so it has a value of 1, but pieces of heterogeneous meta information are not reflected in topic modeling, so they may have a value of 0.

In the LSA method, there is a difference in results according to the number R of the topics, but in terms of classification, the LSA method is considered to have excellent result, compared with the TF-IDF method. Here, an LDA method not illustrated in FIG. 4A to FIG. 4I may provide excellent performance when the number of semantic words is large and complicated.

In the above, the embodiments of the TF-IDF, LSA, and LDA methods for processing semantic words have been described. However, in the present invention, any other semantic word processing method may also be used and a specific semantic word processing method is not necessarily limited.

The media content synthesizing unit 60 illustrated in FIG. 2, which serves to finally synthesize promotional media content using the strategic meta information, the media content, and the similarity information calculated through the association analyzing unit 50, is configured as illustrated in FIG. 5.

FIG. 5 is a detailed block diagram illustrating the media content synthesizing unit 60 illustrated in FIG. 2.

As illustrated in FIG. 5, the media content synthesizing unit 60 includes a project compatible conversion unit 61 and a rendering unit 62.

First, in a step of synthesizing media content such as a picture video, a process of finally synthesizing media, content using meta information or resources is performed.

In general, this process is termed rendering, and a software package performing the process is termed a rendering engine.

A profile file of Equation (11) is synthesized to final promotional media content through the rendering unit 62.

As a rendering engine has higher quality, it may process various formats of input resources and support powerful, various change and filter effect, two-dimensional (2D) and three-dimensional (3D) graphic effects, and the like.

Also, the rendering engine supports various output formats and may be advantageous as stability is higher through various continuous improvements. As the rendering engine, a commercial rendering engine may be used or a rendering engine in an open source form may also be used. Alternatively, a newly developed rendering engine may be used.

Thus, the project files of Equation (12) in the present invention may be converted to fit the rendering unit 62 through the project compatible conversion unit 61.

Other preferred embodiments that may be performed using the technical concept according to the present invention will be described.

First, the present invention may be applied to a technique of synthesizing promotional media content with a natural language-based command through a voice. That is, using the present invention, a user may produce promotional media content by voice in order to synthesize the promotional media content. For example, when the user issues a command of "Please make promotional video of a cozy atmosphere for café!" by voice, a voice recognition software or module may convert the command into a text string, and this information may be regarded as an additional source of strategic meta information to create a query statement. That is, the voice command may be utilized for synthesizing promotional media content.

The technical concept of the present invention may be applied to a technique of synthesizing promotional media content through reference media content. That is, when a picture or video, rather than a voice, is input to configure strategic meta information similar to the example of synthesizing promotional media content with a natural language-based command through the voice, meta information may be extracted by performing image processing, or the like, so as to be used as strategic meta information.

In the technical concept of the present invention, a file name may be used for analyzing media content. That is, in order to classify and recommend media content, in the present invention, a method of performing it using media content and corresponding meta file has been described. In media content configured in a file format as an extended embodiment, a file name itself may also be meaningful information. For example, when it is assumed that there is a file of "apple_middle size_icon.png", it may be estimated that the file is a file in which the corresponding media content represents apple. In a similar example, several file names of pictures, video, and background music included in a specific story container may exist, and these file names may also be utilized as meta information in the same manner. In the present invention, such information is also utilized.

According to the present invention, for a promotional media content producing service, similarity between story container and resource items is calculated and classified automatically on the basis of meta information.

Also, according to the present invention, a story container and resource items previously classified in an erroneous manner may be detected and a classification system thereof may be corrected, and an appropriate story container or resource item may be recommended by strategic meta information in which unstructured or structure information is mixed.

Also, according to the present invention, even when a query statement in a natural language format is generated in order to search for a story container or a resource item, an appropriate template list corresponding to the query statement, among existing templates, may be provided.

The system for producing promotional media content and the method thereof have been described according to the embodiments, but the scope of the present invention is not limited to a specific embodiment. The present invention may be corrected and modified within the technical scope obvious to those skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for producing promotional media content, the system comprising:
   a strategic meta information analysis processing unit configured to process strategic meta information in a plurality of formats to an unstructured data batch having a predetermined weight value;
   a semantic word extracting unit configured to extract a semantic word regarding N number of pieces of meta information regarding a plurality of media contents;
   a semantic word dictionary unit configured to create a dictionary by comparing semantic words extracted by the semantic word extracting unit and words in a predefined dictionary;
   a semantic word-based association analyzing unit configured to calculate similarity value between the pieces of meta information regarding the plurality of media contents on the basis of semantic words by using the dictionary generated by the dictionary unit, and classify the pieces of meta information by using the similarity value;
   an association analyzing unit configured to calculate association between the strategic meta information processed through the strategic meta information analysis processing unit and the plurality of media contents processed through the semantic word-based association analyzing unit; and
   a media content synthesizing unit configured to synthesize promotional media content by using the strategic meta information, the plurality of media contents, and the association information calculated by the association analyzing unit,
   wherein the strategic meta information is expressed with N number of pieces of partial strategic meta information as expressed in Equation (1) below:

$$q = q_1 + q_2 + \ldots + q_N \qquad \text{Equation (1)}$$

wherein each of the pieces of partial strategic meta information has the predetermined weight value as expressed in Equation (2) below, and the sum of all predetermined weight values of the N number of pieces of partial strategic meta information is 1:

$$\{w_1, w_2, \ldots w_N\}, w_1 + w_2 + \ldots + w_N = 1 \qquad \text{Equation (2)}$$

where q is strategic meta information, and w is a weight value.

2. The system of claim 1, wherein the strategic meta information in the plurality of formats include at least one of marketing strategy information, publicity strategy information, user information, user intention information, statistical service information, and feedback information.

3. The system of claim 1, wherein the plurality of media contents is classified in system into
   a common resource item representing media resources such as a picture, video, music, and text information commonly used in a service system or a program;
   a personal resource item representing media content that each user has directly uploaded or purchased; and
   a story container representing an outcome designed by using a gain filter, a change effect, and an overlay effect in order to specifically express an abstract concept called story.

4. The system of claim 3, wherein the plurality of media contents includes at least one of a picture, video, music, text, and font.

5. The system of claim 3, wherein the common resource item, the personal resource item, and the story container include different meta information.

6. The system of claim 1, wherein the semantic word extracting unit extracts the semantic word by using
   a first method of extracting the semantic word by analyzing similarity between a text string input by using a dynamic program and words in the predefined dictionary,
   a second method of separating the input text string to a word set by using a regular expression, removing a meaningless word from the separated word set, and extracting the semantic word, or
   a combination of the first method and the second method.

7. The system of claim 6, wherein when the semantic word extracted by the semantic word extracting unit is not included in the predefined dictionary, the semantic word dictionary unit provides an index to the semantic word and add the semantic word to the dictionary, configures meta information with words present in the created dictionary, converts the meta information into a set of dictionary indices, and stores the converted set in a memory or a file, and thereafter, whenever new media content is added, the semantic word dictionary unit updates the semantic word to create a new dictionary by repeating the process.

8. The system of claim 7, wherein the semantic word-based association analyzing unit uses at least one of topic modeling techniques including at least one of a term frequency-inverse document frequency (TF-IDF) technique, a latent semantic analysis/indexing (LSA) method, and a latent dirichlet allocation (LDA) technique.

9. The system of claim 1, wherein the media content synthesizing unit includes:
   a project conversion unit configured to convert a project file as a set of meta information regarding the plurality of media contents to fit media synthesizing; and
   a rendering unit configured to synthesize the plurality of media contents by using the pieces of meta information converted through the project conversion unit.

10. The system of claim 7, wherein the association analyzing unit creates a query statement by using each strategic meta information such as marketing, publicity strategy, and publicity intention, expresses the created query statement as an index by using the dictionary created by the dictionary unit, expresses the query statement expressed as the dictionary index in a vector space based on topic modeling, calculates similarity value between pieces of meta information describing the media content expressed in the topic-modeled vector space and the input query statement, sorts the pieces of meta information according to the calculated similarity value, and outputs media content having high similarity to the media content synthesizing unit.

11. A method for producing promotional media content, the method performed by a server computer, the method comprising:
   processing strategic meta information in a plurality of formats to an unstructured data batch having a predetermined weight value;
   extracting a semantic word regarding N number of pieces of meta information regarding a plurality of media contents;
   creating a dictionary by comparing the extracted semantic word and words in a predefined dictionary;
   calculating similarity value between the pieces of meta information regarding the plurality of media contents on the basis of semantic words by using the generated dictionary and classifying the pieces of meta information by using the similarity value;
   calculating association between the strategic meta information and the plurality of media contents; and
   synthesizing promotional media content by using the strategic meta information, the plurality of media contents, and the calculated association information,
   wherein the strategic meta information is expressed with N number of pieces of partial strategic meta information as expressed in Equation (1) below:

$$q = q_1 + q_2 + \ldots + q_N \qquad \text{Equation (1)}$$

wherein each of the pieces of partial strategic meta information has the predetermined weight value as expressed in Equation (2) below, and the sum of all predetermined weight values of the N number of pieces of partial strategic meta information is 1:

$$\{w_1, w_2, \ldots w_N\}, \ w_1 + w_2 + \ldots + w_N = 1 \qquad \text{Equation (2)}$$

where q is strategic meta information, and w is a weight value.

12. The method of claim 11, wherein the strategic meta information in the plurality of formats include at least one of marketing strategy information, publicity strategy information, user information, user intention information, statistical service information, and feedback information.

13. The method of claim 11, wherein the plurality of media contents is classified in system into a common resource item representing media resources such as a picture, video, music, and text information commonly used in a service system or a program;
   a personal resource item representing media content that each user has directly uploaded or purchased; and
   a story container representing an outcome designed by using a gain filter, a change effect, and an overlay effect in order to specifically express an abstract concept called story.

14. The method of claim 13, wherein the plurality of media contents includes at least one of a picture, video, music, text, and font.

15. The method of claim 13, wherein the common resource item, the personal resource item, and the story container include different meta information.

16. The method of claim 11, wherein the extracting of a semantic word comprise extracting a semantic word by using a first method of extracting the semantic word by analyzing similarity between a text string input by using a dynamic program and words in the predefined dictionary, by using a second method of separating the input text string to a word set by using a regular expression, removing a meaningless word from the separated word set, and extracting the semantic word, or by combining the first method and the second method.

17. The method of claim 16, wherein the creating of a dictionary comprises:
   when the extracted semantic word is not included in the predefined dictionary, providing an index to the semantic word and adding the semantic word to the dictionary;
   configuring meta information with words present in the created dictionary, converting the meta information into a set of dictionary indices, and storing the converted set in a memory or a file; and
   repeating the process to perform updating whenever new media content is added.

18. The method of claim 17, wherein the classifying of the pieces of meta information comprises classifying the pieces of meta information by using at least one of topic modeling techniques including at least one of a term frequency-inverse document frequency (TF-IDF) technique, a latent semantic analysis/indexing (LSA) method, and a latent dirichlet allocation (LDA) technique.

19. The method of claim 11, wherein the synthesizing of media content comprises:
   converting a project file as a set of meta information regarding the plurality of media content to fit media synthesizing; and
   rendering the plurality of media contents by using the converted pieces of meta information.

20. The method of claim 17, wherein the calculating of association comprises:
   creating a query statement by using each strategic meta information such as marketing, publicity strategy, and publicity intention;
   expressing the created query statement as an index by using the dictionary created by the dictionary unit;
   expressing the query statement expressed as the dictionary index in a vector space based on topic modeling;
   calculating similarity value between pieces of meta information describing the media content expressed in the topic-modeled vector space and the input query statement; and sorting the pieces of meta information according to the calculated similarity value and subsequently outputting media content having high similarity.

* * * * *